US008577146B2

(12) United States Patent
Thörn et al.

(10) Patent No.: US 8,577,146 B2
(45) Date of Patent: Nov. 5, 2013

(54) METHODS AND DEVICES THAT USE AN IMAGE-CAPTURED POINTER FOR SELECTING A PORTION OF A CAPTURED IMAGE

(75) Inventors: Ola Thörn, Malmö (SE); Simon Lessing, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 664 days.

(21) Appl. No.: 12/757,297

(22) Filed: Apr. 9, 2010

(65) Prior Publication Data
US 2011/0249900 A1    Oct. 13, 2011

(51) Int. Cl.
*G06K 9/20* (2006.01)
*G06F 3/033* (2013.01)

(52) U.S. Cl.
USPC .......................... 382/181; 382/282; 715/863

(58) Field of Classification Search
USPC ............ 382/181, 282; 345/156, 157; 715/863
See application file for complete search history.

(56) References Cited

U.S. PATENT DOCUMENTS

| 5,511,148 | A * | 4/1996 | Wellner ........................ 358/1.6 |
| 2003/0152293 | A1 | 8/2003 | Bresler et al. |
| 2004/0080795 | A1 | 4/2004 | Bean et al. |
| 2005/0116945 | A1* | 6/2005 | Mochizuki et al. ........... 345/418 |
| 2008/0056572 | A1* | 3/2008 | Nielsen ........................ 382/173 |
| 2008/0137958 | A1 | 6/2008 | Wang et al. |
| 2008/0233980 | A1* | 9/2008 | Englund et al. ............... 455/466 |
| 2009/0245568 | A1* | 10/2009 | Thelen .......................... 382/100 |
| 2011/0123115 | A1* | 5/2011 | Lee et al. ..................... 382/185 |

FOREIGN PATENT DOCUMENTS

| EP | 0 622 722 A2 | 11/1994 |
| WO | WO 99/21122 A1 | 4/1999 |

OTHER PUBLICATIONS

"Transceiver", http://www.webopedia.com/TERM/T/transceiver.html, accessed on Jan. 10, 2013.*
Bertucci et al., "Text Selection by Structured Light Marking for Hand-held Cameras", Document Analysis and Recognition, 2003. Proceedings of the Seventh International Conference on Aug. 3-6, 2003, Piscataway, NJ, USA, IEEE, pp. 555-559, XP010656824.
Carter et al., "Linking Digital Media to Physical Documents: Comparing Content and Marker-Based Tags", IEEE PERVASIVE Computing, IEEE Service Center, Los Alamitos, CA, US, vol. 9, No. 2, Apr. 1, 2010, pp. 46-55, XP011299888.
Erol et al., "HOTPAPER: Multimedia Interaction with Paper using Mobile Phones", Proceedings of the 2008 ACM International Conference on Multimedia with Co-located Symposium & Workshops; Vancouver, BC, Canada, Oct. 27-31, 2008, ACM Pres, [Online] Oct. 26, 2008, pp. 399-408, XP002516387.

(Continued)

*Primary Examiner* — Jon Chang
(74) *Attorney, Agent, or Firm* — Myers Bigel Sibley & Sajovec, PA

(57) ABSTRACT

An electronic device includes a camera that is configured to generate a visual data signal that corresponds to dynamically captured graphic content that includes an image and a pointer that is operable to communicate a selection characteristic of the image. A signal processor receives the visual data signal and is operable to identify a portion of the image in the dynamically captured graphic content responsive to the selection characteristic communicated by the pointer.

18 Claims, 5 Drawing Sheets

(56) References Cited

OTHER PUBLICATIONS

International Search Report and Written Opinion of the International Searching Authority corresponding to International Application No. PCT/IB2011/000535; Date of Mailing: Jul. 22, 2011; 15 pages.

Kanev et al., "Enhancing Paper Documents with Direct Access to Multimedia for More Intelligent Support of Reading", International Professional Communication Conference, 2006 IEEE, IEEE, PI, Oct. 1, 2006, pp. 84-91, XP031052093.

Olsson et al., "User Expectations for Mobile Mixed Reality Services: an Initial User Study", Proceedings of the ECCE '09 European Conference on Cognitive Ergonomics: Designing beyond the Product—Understanding Activity and User Experience in Ubiquitous Environments, Jan. 1, 2009, XP55000520, Finland.

Wellner, "Interacting with Paper on the DIGITALDESK", Communications of the Association for Computing Machinery, ACM, New York, NY, US, vol. 36, No, 7, Jul. 1993, pp. 87-96; XP000384570.

Notification Concerning Transmittal of International Preliminary Report on Patentability corresponding to International Application No. PCT/IB2011/000535; Date of Mailing: Oct. 18, 2012; 9 pages.

\* cited by examiner

METHODS AND DEVICES THAT USE AN IMAGE-CAPTURED POINTER FOR SELECTING A PORTION OF A CAPTURED IMAGE

FIELD OF THE INVENTION

The present invention relates to mobile terminals and, more particularly, to mobile terminals including cameras and related methods, devices and computer program products.

BACKGROUND

Recently, there has been a proliferation of features in the field of portable communications. Portable communications devices, such as cordless and cellular telephones, pagers, wireless modems, wireless email devices, personal digital assistants (PDAs) with communication functions, MP3 players and other portable communications devices are becoming more commonplace. Some of these mobile terminals are equipped with cameras and may be configured to communicate with a data network, such as the Internet, over the wireless communications network. Users of these mobile terminals typically take these devices with them anywhere they go, which allows these users to, for example, place phone calls, check an appointment on a calendar, check email, take pictures and/or access the Internet and the information available thereon using the mobile terminal.

One application for camera use in a mobile device may include capturing printed information, such as, for example, text data that is provided in a print medium. However, cameras on conventional mobile devices may lack the resolution to capture the text data in a useful form without being so close to the printed media that only a limited amount of text is within the field of view of the camera. Although the camera resolution may be improved, such improvements may be spatially impractical and/or costly.

SUMMARY

An electronic device according to some embodiments includes a camera that is configured to generate a visual data signal. The visual data signal may correspond to dynamically captured graphic content that includes an image and a pointer. The pointer may be operable to communicate a selection characteristic of the image. A signal processor may receive the visual data signal and identify a portion of the image in the dynamically captured graphic content responsive to the selection characteristic communicated by the pointer.

Some embodiments provide that the pointer includes at least one user digit, such as, for example a finger and/or thumb. The selection characteristic may include an underline characteristic that is operable to identify the portion of the image by an underlining motion that is dynamically captured by the camera. In some embodiments, the selection characteristic includes a border characteristic that defines a starting point that corresponds to a first user digit and an ending point that corresponds to a second user digit. The portion of the image may be between the starting and ending points that are defined by the user digits.

Some embodiments provide that the starting and ending points are horizontally spaced apart to define the portion of the image as one or more words in a line of text data. In some embodiments, the starting and ending points are vertically spaced apart to define the portion of the image as multiple lines of text data. Some embodiments provide that the selection characteristic includes an aspect ratio characteristic that defines a substantially rectangular portion of text data by diagonally opposite corners.

Some embodiments include a transceiver that is configured to send the portion of the image to a processor that is configured to analyze the portion of the image. The processor may be external to the electronic device and may identify a source corresponding to the image after analyzing the portion of the image. The transceiver may receive source data corresponding to the image responsive to the processor identifying the source. In some embodiments, the source data includes a source name, a unique source identifier, and/or text data that corresponds to the portion of the image.

Some embodiments provide that the processor is configured to analyze the portion of the image by recognizing at least one pattern in the portion of the image. A pattern may include text data appearance, format and/or at least one group of multiple words of text.

In some embodiments, the visual data signal includes a video signal that includes multiple frames per second of the image and the pointer. A processor may analyze the portion of the image and identify a source corresponding to the image.

Some embodiments provide that the electronic device is a mobile communication terminal.

Some embodiments of the present invention include methods for capturing text data. Operations according to some embodiments of such methods may include identifying a portion of an image by generating a video signal of at least one section of the image and a user directed pointer. The user directed pointer may be operable to identify the portion of the image.

In some embodiments, the user directed pointer includes at least one user digit, such as, for example, a finger and/or thumb. Some embodiments provide that identifying the portion of the image includes receiving video data of the image and the user digit that identifies the portion of the image and sending the portion of the image to a processor that is operable to analyze the portion of the image.

In some embodiments, the processor includes an external processor sending the portion of the image includes streaming video data to the external processor. The streaming video data may include the portion of the image that is identified by the user digit in the video data.

Some embodiments provide that the image includes alphanumeric text and the video data corresponds to user digit gestures that identify a portion of the alphanumeric text. Operations may include analyzing the portion of the alphanumeric text to identify a source of the alphanumeric text and generating source data corresponding to the source. Some embodiments provide that source data corresponding to the image may be received. The source data may include a source name, a unique source identifier, and/or text data that corresponds to the portion of the alphanumeric text.

In some embodiments, identifying the portion of the image includes capturing a marking-up function in the generated video signal via user digit gestures relative to the image.

Other devices, methods, and/or computer program products according to embodiments of the invention will be or become apparent to one with skill in the art upon review of the following drawings and detailed description. It is intended that all such additional devices, methods, and/or computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the invention and are incorporated in and constitute a part of this application, illustrate certain embodiment(s) of the invention.

DETAILED DESCRIPTION

Figure 1:
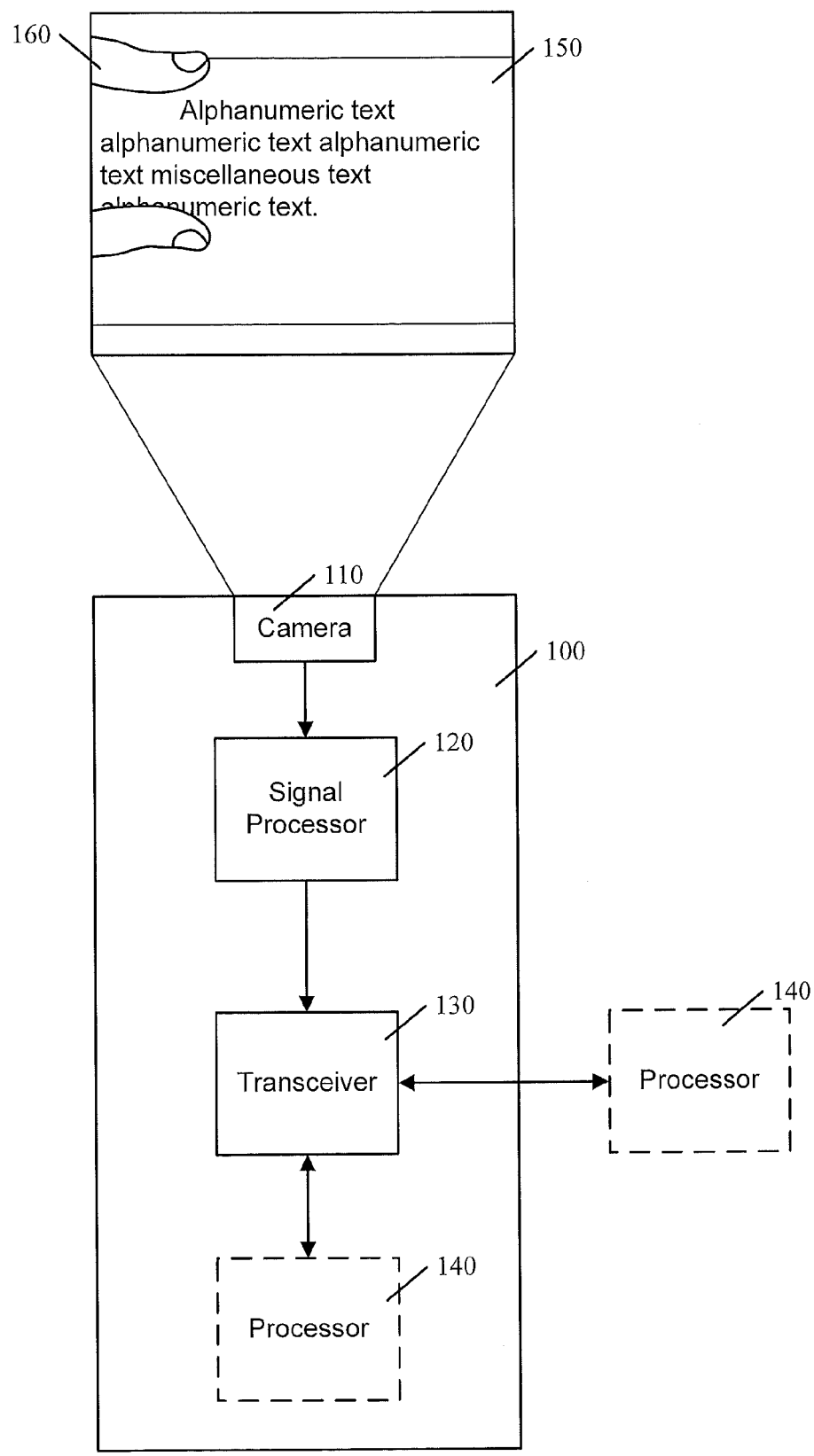
FIG. 1 is a block diagram illustrating an electronic device for using an image-captured pointer for selecting a portion of a captured image in accordance with some embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof. As used herein, the term "and/or" includes any and all combinations of one or more of the associated listed items. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this disclosure and the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Embodiments of the present invention arise from the realization that electronic devices, such as mobile terminals, PDAs, cellular telephones, etc. may not include sufficient camera resolution and/or processing capabilities to practically perform optical character recognition (OCR) of text data captured from an image. Some embodiments provide that OCR may enable taking pictures of signs, book and/or periodical portions, handwritten notes, etc. and decoding to provide text data that may be searchable, editable (e.g., copy, cut, paste), translation, etc. In this regard, according to embodiments herein, a pointer, such as user digit (i.e., finger, thumb, etc.) may be captured with the image and may be used to mark and/or select a portion of the image to be captured and/or identified. As such, a portion of the image may be marked in the image by the pointer to identify specific words, lines and/or paragraphs for subsequent analysis. Many images may include more information than may be practically captured in a single image.

By way of example, it may be desirable to capture portions of a page in a book. However, a camera that is sufficiently far from the book to capture significant portions of a page may be unable to resolve the text because of the increased distance. Accordingly, embodiments described herein may use video capture including multiple frames per second instead of still images. In this regard, the video may be positioned more closely to the book, for example, and the portion of the text may be dynamically captured including the positions and/or gestures of the pointer. Although described herein in the singular, the term "pointer" may refer to multiple pointers and/or pointer components. By using a video instead of still pictures, all of the content may be scanned at a proximity that may capture the image with sufficient clarity and/or resolution. The desired portion of the book may be dynamically captured by using a selection characteristic that is provided by the pointer.

Reference is now made to FIG. 1, which is a block diagram illustrating an electronic device for using an image-captured pointer for selecting a portion of a captured image in accordance with some embodiments of the present invention. The electronic device 100 may include a camera 110 that is configured to generate a visual data signal that includes content corresponding to an image 150 and a pointer 160. In some embodiments, the pointer 160 may include one or more user digits, however, the invention is not so limited. For example, one or more fingers and/or thumbs may be used as a pointer 160.

Some embodiments provide that the visual data signal includes dynamically captured graphic content, such as, for example, may be provided in a motion video that includes multiple frames of images per second. A signal processor 120 may receive the visual data signal from the camera 110 and may identify a portion of the image 150 in the content that corresponds to the selection characteristic provided by the pointer 160. In this manner, the desired portion of the image 150 may be dynamically identified in the visual data signal. Identification of the portion of the image using a pointer image that is captured in the visual data signal may be performed in lieu of, for example, on screen mark-ups and/or editing that might otherwise be performed after the image is captured. Accordingly, the need for sophisticated user interfaces, such as, for example, a touch-sensitive screen, for marking and/or editing the image may be obviated.

The electronic device 100 may include a transceiver 130 that may send the portion of the image determined by the signal processor 120 to a processor 140 that is configured to analyze the portion of the image that is identified by the pointer 160. In some embodiments, the processor 140 may be external to the electronic device and/or may be incorporated into a network and/or device that may be communicatively coupled to the electronic device 100 via the transceiver 130. The transceiver 130 may include a cellular transceiver that may include both a transmitter (TX) and a receiver (RX) to allow two way communications, but the present invention is not limited to such devices.

The electronic device 100 may thereby communicate with a device and/or network using radio frequency signals, which may be communicated through an antenna (not shown). For example, the electronic device 100 may be configured to communicate via the transceiver 130 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Some embodiments provide that the electronic device 100 may also communicate with a wireless local device and/or network using a communication protocol that may include, but is not limited to, 802.11a, 802.11b, 802.11e, 802.11g, 802.11i, and/or other wireless local area network protocols.

In some embodiments, the processor 140 may be internal to the electronic device 100 and the transceiver 130 may include an internal data transfer and/or data bus management function. As described herein, the signal processor 120 and/or the processor 140 may each be a general purpose processor and/or a digital signal processor, which may be enclosed in a common package or separate and apart from one another.

Some embodiments provide that the processor 140 is external to the electronic device 100 and may identify a source corresponding to the image 150 by analyzing the portion of the image that is generated via the image captured pointer 160. In contrast with conventional OCR, which typically identifies individual characters of text, patterns corresponding to the portion of the image may be compared to known sources. For example, some commercial and/or publicly available book search services may provide a data source for identifying the source. Patterns may include the visual appearance of text corresponding to specific word, line and/or image combinations. Some embodiments provide that patterns may include a text appearance, a text format and/or at least one set of multiple words of text. Since patterns of text may be matched instead of individual characters, a video including a lower resolution than a still image may be used. In this manner, the source of the image may be identified without the processing intensive operations associated with OCR.

Once the processor 140 identifies the source, the transceiver 130 may receive source data corresponding to the image 150. In some embodiments, the source data may include a source name, a unique source identifier, and/or text data that corresponds to the portion of the image. Some embodiments provide that the source name and/or unique source identifier may be used to purchase the source material and/or add the source to a list such as an online shopping cart, a preference list, a recommended list and/or a gift registry, among others. In some embodiments, the text data that corresponds to the source may be received by the transceiver 130 so that the text may be edited and/or included in another text document.

Figure 2A:
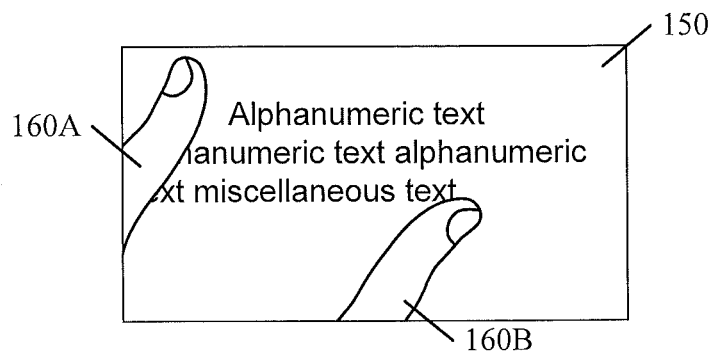
FIGS. 2A-2D are diagrams illustrating different respective pointer gestures that correspond to selection characteristics of the image in accordance with some embodiments of the present invention.

Reference is now made to FIGS. 2A-2D, which are diagrams illustrating different respective pointer gestures that correspond to selection characteristics of the image in accordance with some embodiments of the present invention. Referring to FIG. 2A, the pointer 160 includes two user digits 160A, 160B. A starting point of the image portion corresponds to a first user digit 160A and an ending point of the image portion corresponds to a second user digit 160B. Some embodiments provide that the selection characteristic corresponding to the diagonal positioning of the user digits 160A, 160B relative to the image 150 defines an aspect ratio characteristic that defines a substantially rectangular portion of textual data by diagonally opposite corners. In this manner, a camera 110 may be closer to an image 150 than might be available when capturing a source image having a different aspect ratio.

Figure 2B:
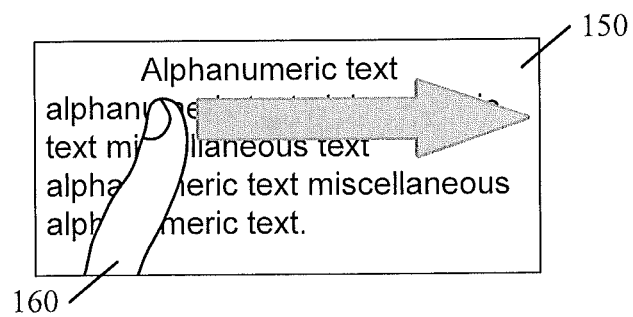

Referring to FIG. 2B, the pointer 160 may include a user digit that gestures to provide a selection characteristic corresponding to an underline characteristic. The underline characteristic may be operable to identify the portion of the image by an underlining motion that is dynamically captured in the video signal.

Figure 2C:
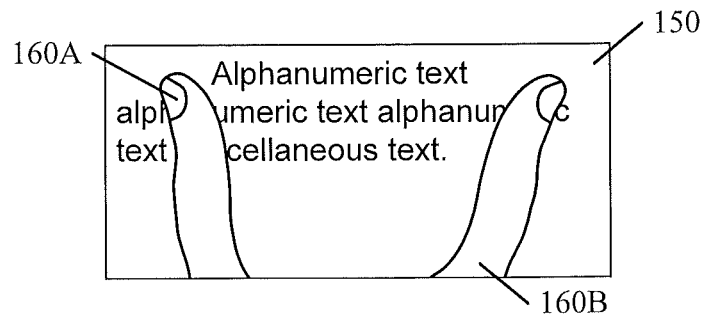
Figure 2D:
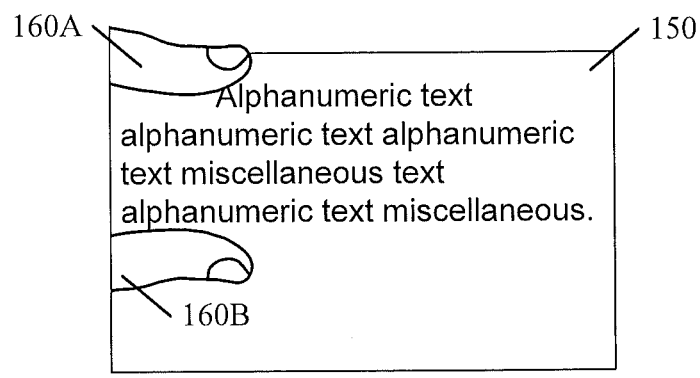

Referring to FIG. 2C, the pointer 160 including two user digits 160A, 160B may define a selection characteristic as a border characteristic. For example, the border characteristic may define starting point that corresponds to the first user digit 160A and an ending point that corresponds to the second user digit 160B. The portion of the image 150 may be defined as that portion within and/or between the borders defined by the starting and ending points. As illustrated, some embodiments provide that the starting point and the ending point are horizontally spaced apart to define the portion of the image as multiple words in a line of text data. Briefly referring to FIG. 2D, some embodiments provide that the starting point and the ending point are spaced apart vertically to define the portion of the image as multiple lines of text data. Although illustrated and discussed herein in terms of text data, the invention is not so limited. For example, devices and operations described herein may be used to capture and/or identify portion of images that include non-text data such as graphical images. Additionally, images may include combinations of text and graphical images which may be captured and/or identified using operations as described herein.

Figure 3:
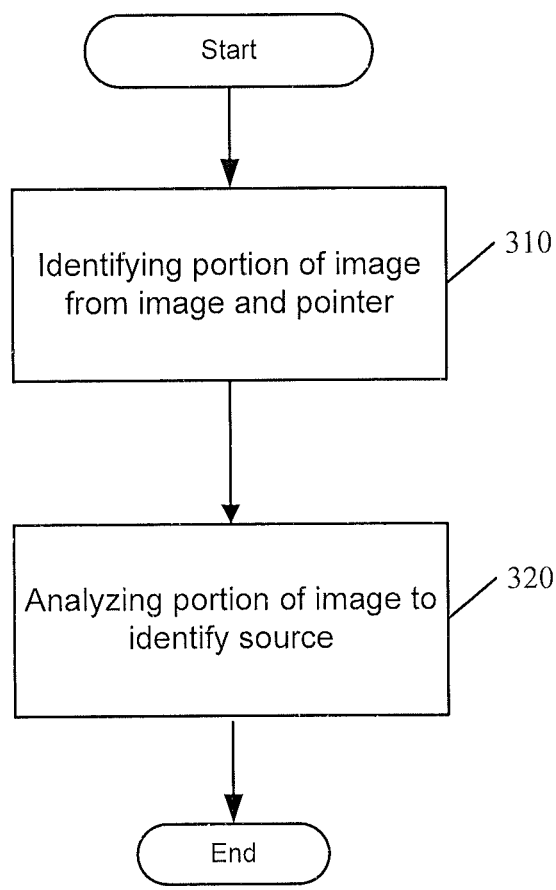
FIG. 3 is a block diagram illustrating operations for capturing text data according to some embodiments of the present invention.

Reference is now made to FIG. 3, which is a block diagram illustrating operations for capturing text data according to some embodiments of the present invention. A portion of an image is identified by generating a video signal of at least one section of the image and a user directed pointer (block 310). The video signal may be generated using, for example, an electronic device such as a mobile terminal or other portable electronic and/or communication device.

The user directed pointer may be operable to identify the portion of the image within the video signal. In some embodiments, user directed pointer includes a user digit, such as, for example, a finger and/or thumb. In this manner, a user may identify the portion of the image using a finger while the video signal is being generated. This may obviate the need for editing and/or mark-up operations on the video content after the video is generated. As such, some embodiments provide that the video signal may be transmitted and/or streamed as the video signal is being generated. For example, some embodiments provide that transmission of the video signal may occur substantially in real time as the image data is being recorded and/or captured.

In some embodiments, identifying the portion of the image includes receiving video data of the image and the user digit that identifies the portion of the image and sending the portion of the image to a processor that is operable to analyze the portion of the image. Some embodiments provide that the processor may be within the electronic device and/or external to the electronic device. For example, the processor may be a component in a network and/or device that is communicatively coupled to the electronic device via a telecommunication and/or network communication link that may be wireless and/or wired. In some embodiments, sending the portion of the image may include streaming video data that includes the portion of the image that is identified by the user digit in the video data to an external processor. Some embodiments provide that a determination regarding which of an internal processor or an external processor to use may be made responsive to wireless service characteristics such as, for example, bandwidth, signal strength, and/or quality of service (QOS), among others.

Some embodiments provide that the image may include alphanumeric text. The user directed pointer may include at least one user digit, such as, for example, a finger and/or thumb, although embodiments herein are not so limited. For example, a stylus that may be detected and/or designated for pointing within a video may be used according to some embodiments. The portion of the image may be identified by generating video data corresponding to user digit gestures that identify the portion of the alphanumeric text.

Operations may optionally include analyzing the portion of the alphanumeric text to identify a source thereof (block 320). In some embodiments, once the source of the alphanumeric text is identified, corresponding source data may be generated and/or retrieved. For example, if the source is identified as a particular publication, data corresponding to the publication may be retrieved from an external data source and/or database. Some embodiments provide that source data may include a source name, a unique source identifier, such as, for example, an International Standard Book Number (ISBN), text data that corresponds to the portion of the alphanumeric text, and/or inventory levels corresponding to entities that may be able to provide the source as part of a commercial transaction, among others. Once the source is identified, data corresponding to the analyzed portion of the image may be received.

In some embodiments, identifying the portion of the image corresponds to capturing a marking-up function in the generated video signal via user digit gestures relative to the image. In this regard, by capturing the marked-up portion in the video signal, editing a generated image and/or video signal may be rendered unnecessary.

Figure 4:
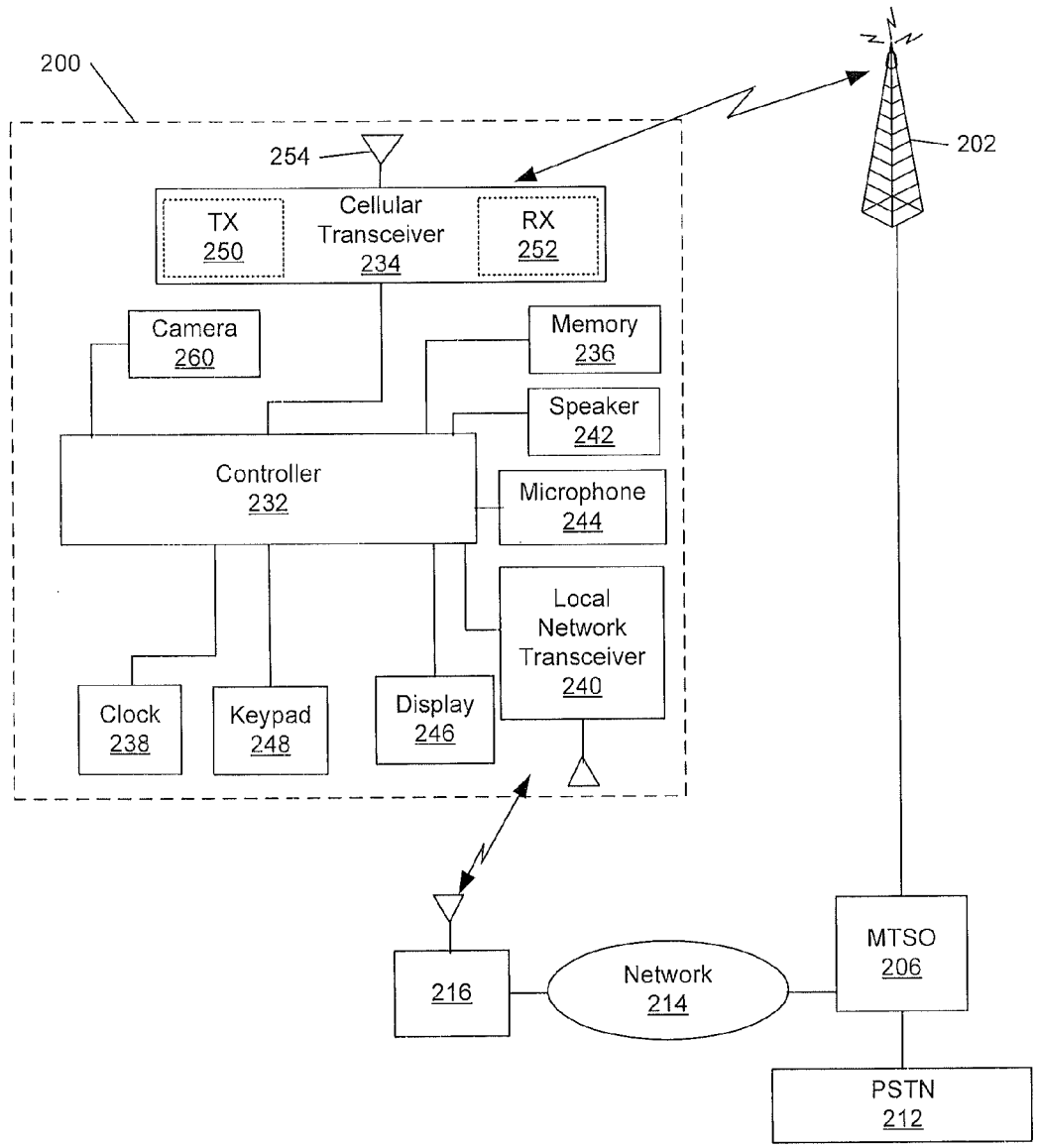
FIG. 4 is a schematic block diagram of a wireless communication system that includes a wireless terminal 200.

Reference is now made to FIG. 4, is a schematic block diagram of a wireless communication system that includes a wireless terminal 200. In some embodiments, the wireless terminal 200 may include a mobile wireless communications terminal that receives wireless communication signals from a cellular base station 202 and/or a wireless local network 216. The cellular base station 202 is connected to a MTSO 206, which, in turn, is connected to a PSTN 212, and a network 214 (e.g., Internet). The mobile terminal 200 may communicate with the wireless local network 216 using a communication protocol that may include, but is not limited to, 802.11a, 802.11b, 802.11e, 802.11g, 802.11i, and/or other wireless local area network protocols. The wireless local network 216 may be connected to the network 214.

In some embodiments of the invention, the mobile terminal 200 includes various components, such as a camera 260, a controller 232, a cellular transceiver 234, a memory 236, a timing circuit (clock) 238, a local network transceiver 240, a speaker 242, a microphone 244, a display 246 and a keypad 248. Some embodiments provide that the display 246 may include a touch sensitive display or screen, or the like.

The memory 236 stores software that may be executed by the controller 232, and may include one or more erasable programmable read-only memories (EPROM or Flash EPROM), battery backed random access memory (RAM), magnetic, optical, or other digital storage device, and may be separate from, or at least partially within, the controller 232. The controller 232 may include more than one processor, such as, for example, a general purpose processor and a digital signal processor, which may be enclosed in a common package or separate and apart from one another. In particular, the controller 232 may be configured to control various functions of the wireless terminal 200, including receiving input from a touch sensitive screen or keypad 248.

As shown in FIG. 4, the cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with the base station 202 using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS), among others. Communication protocols as used herein may specify the information communicated, the timing, the frequency, the modulation, and/or the operations for setting-up and/or maintaining a communication connection. In some embodiments, the antennas 228 and 254 may be a single antenna.

It is to be understood that the present invention is not limited to the particular configuration shown in FIGS. 1, 3 and 4, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture may be implemented as a single processor system or a multi-processor system in accordance with various embodiments of the present invention.

The present invention may be embodied as methods, electronic devices, and/or computer program products. Some embodiments of the present invention were described above with reference to block diagrams and/or operational illustrations of methods and electronic devices. In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations can be embodied on analog circuitry and/or digital circuitry. These program instructions may be provided to a controller circuit, which may include one or more general purpose processors, special purpose processors, ASICs, and/or other programmable data processing apparatus, such that the instructions, which execute via the controller, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a controller circuit to function in a particular manner, such that the instructions stored in the computer usable or computer-readable memory produce an article of manufacture including instructions that implement the function specified in the flowchart and/or block diagram block or blocks. The computer-usable or computer-readable medium may be, for example but not limited to, an electronic, magnetic, optical, electromagnetic, or semiconductor system, apparatus, or device. More specific examples (a nonexhaustive list) of the computer-readable medium include the following: hard disk devices, optical storage devices, magnetic storage devices, random access memory (RAM) devices, read-only memory (ROM) devices, erasable programmable read-only memory (EPROM or Flash memory) devices, and compact disc read-only memory (CD-ROM).

Many different applications/variations will be apparent to a skilled person having knowledge of the present disclosure. In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. An electronic device, comprising:
   a camera that is configured to generate a visual data signal that corresponds to dynamically captured graphic content that includes an image and a pointer that is operable to communicate a selection characteristic of the image, wherein the pointer comprises a user digit, and wherein the selection characteristic comprises an underline characteristic that is operable to identify the portion of the image by an underlining motion that is dynamically captured;
   a signal processor that receives the visual data signal and is operable to identify a portion of the image in the dynamically captured graphic content responsive to the selection characteristic communicated by the pointer; and
   a transceiver that is configured to send the portion of the image to a processor that is external to the electronic device, wherein the external processor is configured to analyze the portion of the image and to identify a source corresponding to the image responsive to analyzing the portion of the image, and wherein the transceiver is further configured to receive source data corresponding to the image responsive to the processor identifying the source, and
   wherein the signal processor is further configured to provide the source data for use on the electronic device.

2. The electronic device of claim 1,
   wherein the pointer comprises two user digits,
   wherein the selection characteristic comprises a border characteristic that defines starting point that corresponds to a first one of the two user digits and an ending point that corresponds to a second one of the two user digits, and
   wherein the portion of the image is between the starting point and ending point.

3. The electronic device of claim 2, wherein the starting point and the ending point are horizontally spaced apart to define the portion of the image as a plurality of words in a line of text data.

4. The electronic device of claim 2, wherein the starting point and the ending point are spaced apart to define the portion of the image as a plurality of lines of text data.

5. The electronic device of claim 1,
   wherein the pointer comprises two user digits,
   wherein the selection characteristic comprises an aspect ratio characteristic that defines a substantially rectangular portion of text data by diagonally opposite corners thereof.

6. The electronic device of claim 1, wherein the source data comprises a source name, a unique source identifier, and/or text data that corresponds to the portion of the image.

7. The electronic device of claim 1, wherein the processor is configured to analyze the portion of the image by recognizing at least one pattern in the portion of the image, the at least one pattern including a text data appearance, a text data format and/or at least one set including multiple words of text.

8. The electronic device of claim 1, wherein the visual data signal comprises a video signal that includes multiple frames per second of the image and the pointer.

9. The electronic device of claim 1, wherein the electronic device comprises a mobile communication terminal, and wherein the transceiver is a wireless transceiver to send and receive wireless communication signals over the network to allow two-way voice and data communications with the mobile communication terminal.

10. The electronic device of claim 1, wherein the signal processor is further configured to provide the source data for at least one of manipulation, listing and shopping through user operation of the electronic device.

11. A method comprising:
    identifying a portion of an image and a user directed pointer captured by a camera of a mobile communication terminal responsive to the user directed pointer that is operable to identify the portion of the image, wherein the user directed pointer includes a user digit, and wherein the image includes alphanumeric text;
    generating visual data representing the portion of the image;
    sending the visual data over a network to a processor external to the mobile communication terminal that is configured, to identify a source of the alphanumeric;
    text and generate source data corresponding to the source;
    receiving the source data over the network; and
    providing the source data for use on the mobile communication terminal.

12. The method of claim 11, wherein the user directed pointer includes a user digit, wherein identifying the portion of the image further comprises:
    receiving video data of the image and the user digit that identifies the portion of the image.

13. The method of claim 12,
    wherein sending the visual data representing the portion of the image comprises streaming video data to the external processor, the streaming video data including the portion of the image that is identified by the user digit in the video data.

14. The method of claim 13, further comprising receiving data corresponding to the image responsive to analyzing the portion of the image that is identified by the user digit.

15. The method of claim 11, wherein the source data includes a source name, a unique source identifier, and/or text data that corresponds to the portion of the alphanumeric text.

16. The method of claim 11, wherein identifying the portion of the image comprises capturing a marking-up function in the generated visual data via user digit gestures relative to the image.

17. The method of claim 11, wherein providing the source data for use comprises providing the source data for at least one of user manipulation, listing and shopping.

18. The method of claim 11, wherein the network is a wireless network.

* * * * *